United States Patent
Collier

(10) Patent No.: US 11,359,296 B1
(45) Date of Patent: Jun. 14, 2022

(54) SYSTEM AND METHOD OF REPURPOSING $CO_2$ INCORPORATED INTO A SOLVENT-BASED MEDIA INTO USABLE MATERIALS

(71) Applicant: Terence Collier, Rowlett, TX (US)

(72) Inventor: Terence Collier, Rowlett, TX (US)

(*) Notice: Subject to any disclaimer, the term of this patent is extended or adjusted under 35 U.S.C. 154(b) by 440 days.

(21) Appl. No.: 16/276,982

(22) Filed: Feb. 15, 2019

Related U.S. Application Data

(60) Provisional application No. 62/695,230, filed on Jul. 9, 2018, provisional application No. 62/695,289, filed on Jul. 9, 2018.

(51) Int. Cl.
| | |
|---|---|
| *C25B 9/00* | (2021.01) |
| *C25B 11/031* | (2021.01) |
| *B01D 53/14* | (2006.01) |
| *C25B 1/04* | (2021.01) |
| *C25B 9/17* | (2021.01) |
| *C25B 11/00* | (2021.01) |
| *C25B 11/051* | (2021.01) |
| *C25B 11/061* | (2021.01) |
| *C25B 11/075* | (2021.01) |

(52) U.S. Cl.
CPC ........ *C25B 11/031* (2021.01); *B01D 53/1418* (2013.01); *B01D 53/1425* (2013.01); *B01D 53/1475* (2013.01); *C25B 1/04* (2013.01); *C25B 9/17* (2021.01); *C25B 11/00* (2013.01); *C25B 11/051* (2021.01); *C25B 11/061* (2021.01); *C25B 11/075* (2021.01)

(58) Field of Classification Search
CPC .. C25B 9/17; C25B 9/00; C25B 11/04; C25B 11/031; C25B 11/00; C25B 11/02; C25B 11/03; C25B 11/061; C25B 11/077
See application file for complete search history.

(56) References Cited

U.S. PATENT DOCUMENTS

| | | | |
|---|---|---|---|
| 2014/0332401 A1* | 11/2014 | Gilliam | C25B 15/08 205/555 |
| 2017/0073825 A1* | 3/2017 | Sugano | C25B 1/04 |

* cited by examiner

*Primary Examiner* — Zulmariam Mendez
(74) *Attorney, Agent, or Firm* — Michael Diaz

(57) ABSTRACT

A $CO_2$ capture and sequestration system. The system includes a reduction cell for separating a solvent-based carrier having an anode generating oxygen and a cathode generating hydrogen from the solvent-based carrier. In addition, the system includes a power supply for providing electrical power to the anode and the cathode. An electrolysis process occurs where oxygen and hydrogen are produced. The anode and the cathode include a plurality of geometrical constructs to increase an active surface area of the anode and cathode to increase an efficiency of the electrolysis process. The geometrical constructs may include vias and pillars.

36 Claims, 7 Drawing Sheets

SYSTEM AND METHOD OF REPURPOSING $CO_2$ INCORPORATED INTO A SOLVENT-BASED MEDIA INTO USABLE MATERIALS

RELATED APPLICATIONS

This utility application claims the benefit of U.S. Provisional Patent Application Ser. No. 62/695,230 filed Jul. 9, 2018 by Terence Collier and U.S. Provisional Patent Application Ser. No. 62/695,289 filed Jul. 9, 2018 by Terence Collier which are both hereby incorporated by reference.

BACKGROUND OF THE INVENTION

Field of the Invention

The invention relates to $CO_2$ capturing and repurposing. Specifically, and not by way of limitation, the present invention relates to a system for capturing and repurposing $CO_2$ incorporated into a solvent-based media into usable materials.

Description of the Related Art

The constantly increasing $CO_2$ levels have been correlated to increasing global temperatures, rising sea levels, local environmental and ecological concerns at a cost that could approach trillions of dollars to mitigate the impact of increasing $CO_2$ levels. It would be advantageous to have a solution to capture and reduce $CO_2$ levels both in terms of the environment as well as the global economy. By utilizing the seemingly unlimited resource of terrestrial, air and aquatic $CO_2$, it is also possible to generate fuels and raw materials for complex compounds, both organic and inorganic, at a substantially reduced rate, thereby minimizing the need for consumption of non-renewable petroleum reserves. It would be advantageous to have a system for not only reducing $CO_2$ emissions by capture but the conversion of the $CO_2$ into viable materials.

Catalysts are effective tools for conversion and repurposing materials. The catalysts can be powders, solutions, membranes or plates Typically, electrodes are plates of metal (or other materials) with a target composition set to optimize the generation (preference) of the formation of a targeted by-product. In addition, the plates may also have features or additional materials added to improve the plate's surface area and reactivity. It would be advantageous to have a system where $CO_2$ locked into a solvent-based (i.e., liquid, gas, or solid form) media can be captured, sequestered or "repurposed" to usable materials rather than recycled back into the environment using technologies and applications familiar to semiconductor packaging techniques. In the present application, the repurposing leads to the reduction of absolute levels of $CO_2$ in a given system. That system could be, but not limited to the atmosphere, ocean, a man-made solution, environment, etc. where size is not a limiting factor. Repurpose means not only efficiency at capture (or previously captured $CO_2$) but also generation of useful by-products such as $H_2$, $O_2$, and CO precursors (syngas).

The present invention provides a system for reducing the amount of $CO_2$, and possibly other products not limited to $CO_2$ and understood by those familiar in the industry, in our air, land and water while simultaneously creating a useful by-product, such as formic acid (HCOOH), methanol ($CH_3OH$), ethylene ($C_2H_4$), methane ($CH_4$), carbon monoxide (CO), hydrogen and oxygen. Reducing $CO_2$ emissions helps in mitigating problems that can lead to climatic issues as well as ecological concerns. The ability to convert this abundant natural resource into fuel or useful precursor materials presents an opportunity to a potential environment destructive material into a multi-million-dollar business opportunity.

SUMMARY OF THE INVENTION

In one aspect, the present invention is directed to a $CO_2$ capture and sequestration system. The system includes a reduction cell for separating a solvent carrier having an anode generating oxygen and a cathode generating hydrogen from the solvent carrier. In addition, the system includes a power supply for providing electrical power to the anode and the cathode. An electrolysis process occurs where oxygen and hydrogen are produced. The anode and the cathode include a plurality of geometrical constructs to increase an active surface area of the anode and cathode to increase an efficiency of the electrolysis process. The geometrical constructs may include vias and pillars.

DESCRIPTION OF THE INVENTION

Figure 1:
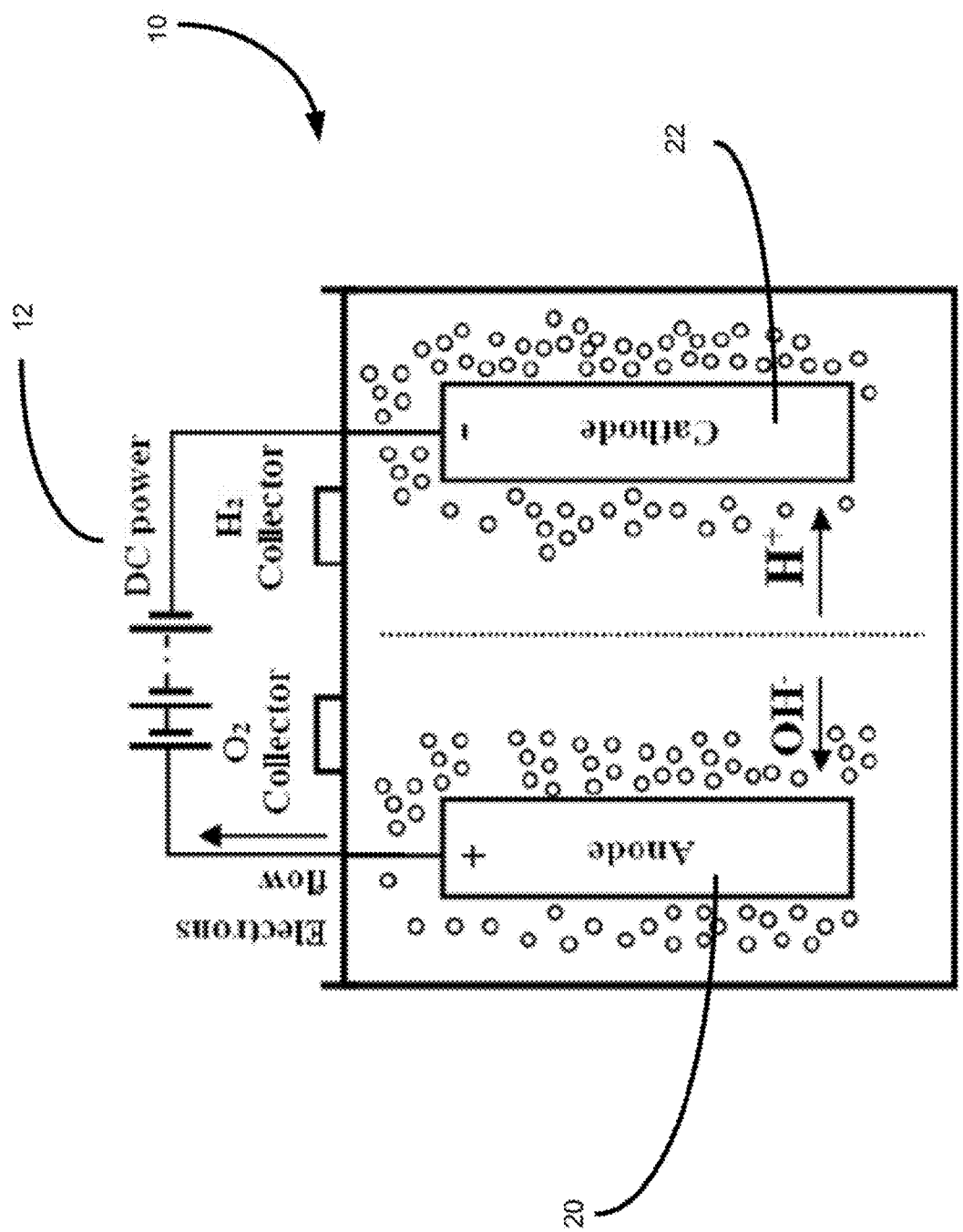
FIG. 1 illustrates a standard aqueous solution reduction cell (electrolysis) in one embodiment of the present invention.

The present invention is a system for the capture and repurposing $CO_2$ incorporated into a solvent-based carrier media into usable materials. In the present invention, $CO_2$ locked into a solvent-based media or carrier may be "repurposed" to usable materials rather than recycled back into the environment using solutions familiar to semiconductor packaging techniques. By capturing and repurposing the $CO_2$, the absolute levels of $CO_2$ are reduced in a micro and macro embodiment are reduced in a system (e.g., atmosphere, water, land, or man-made). Furthermore, repurposing provides not only efficiency at capture (or previously captured $CO_2$) but also the generation of useful by-products such as $H_2$, $O_2$, and CO precursors (syngas).

Carbon dioxide is the result of the oxidation of carbon compounds. When carbon compounds are burned, as with our fossil fuels, a mixture of various carbon oxides, primarily carbon dioxide, are generated. Whether the initial carbon source is a living organism, such as trees and grasslands or organisms that perished eons ago (coal or oil), $CO_2$ is produced as a waste product. As a stable molecule, the $CO_2$ waste gas has a long term and pronounced effect on the environment, altering the dynamics of the biosphere. While $CO_2$ is a requirement for the cycle of life (a vast number of organisms on land and in the oceans convert $CO_2$, sunlight and water to fuel), too much $CO_2$, even in the oceans, can be equally detrimental to life and disrupt the natural balance of the biosphere. An object of the present invention is to capture and turn that waste product into useful products, while reducing the overall rate of $CO_2$ in the atmosphere. Higher $CO_2$ levels can lead to increasing atmospheric temperatures and the acidification of water sources. Dissolved $CO_2$ changes the pH of our oceans or other water sources by forming carbonic acid. Higher acidic conditions cause die offs in the organisms that convert $CO_2$ to oxygen, further exacerbating the problem. With the vast amount of $CO_2$ absorbed in the oceans, an additional problem can occur as the oceans heat. Colder water holds more dissolved gas than warm water, so the warmer waters release the trapped $CO_2$ they contain, returning additional $CO_2$ to the atmosphere (carbonic acid forms regardless if the source is fresh, salt or brackish). Regardless if the water source is fresh or salt, nature has demonstrated that using water to capture and grab $CO_2$ is an effective practice as demonstrated by the fact that oceans alone grab and hold much more $CO_2$ than all the forests and green spaces combined. For reference, at room temperature, 1 kilogram of water will hold 1.5 grams of $CO_2$ yet only 0.04 grams of $O_2$ and 0.015 of nitrogen are held in the water. To illustrate this concept, the Atlantic just outside the Amazon rain forest has more stored $CO_2$ than the entire Amazon rain forest. The present invention utilizes the conversion of a solvent-based carrier such as an aqueous solution or aerosol to carbonic acid as a material source for efforts at $CO_2$ reduction. By removing the dissolved $CO_2$ from the solvent and returning the solvent to its original state or reduced state of gas or carbonates, the present invention provides a carbon capture system, based on the conversion of dissolved $CO_2$ to a CO precursor, which is an energy efficient method to reduce $CO_2$ while yielding useful by-products.

It should be noted that micro structures are inherently more efficient than their macro counterparts. Using micro structures, it is possible to improve, but not limit, the efficiency of a simple plate electrode by 4,100 percent or more, transforming a 4-inch electrode to the equivalent of a 25.5-inch electrode. In one application of the present invention, the present invention is fabricated with through glass via (TGV) structures which demonstrate an improvement in efficiency and equivalent area of a 4-inch electrode by 13.459 percent or more or the equivalent of a 45.8-inch electrode. Separate or combined, micro structure fabrication and vias provide a viable approach to using semiconductor technology to help reduce and potentially convert the amount of $CO_2$ in our terrestrial, atmospheric and oceans as well as man-made systems.

Flat plate cathodes/anodes are typical in many industries, such as the semiconductor fabrication industry. In one embodiment of the present invention, micro features (pillars) are added to flat plate cathodes/anodes, which can improve plate efficiency by over 4,000 percent. In one embodiment, an antenna may perform equivalent to a wireless system while performing its core pillar functionality. It is possible to further increase the surface area by changing the geometry of the pillars as well as the number of pillars per area.

In another embodiment of the present invention, thin film palladium (Pd) films filters ($H_2$) using TGVs simulate controlled porosity substrates similar to a membrane. By capping the pore structures with a thin Pd layer, Pd being a natural $H_2$ filter, the $H_2$ can be separated or assist in the purification of other gases/solutions. Lining a via with Pd also has the effect of grabbing and collecting $H_2$ particularly, but not limited to, the vapor phase.

In another embodiment of the present invention, TGV structures are utilized as a platform to be coated with some baseline metal to evaluate purpose and repurpose as both active anodic/cathodic structures and membranes. These structures have the capability of increasing the relative surface area by up to or more than 13,000 percent and minimizing the amount of power required in the system. In another embodiment, the surface area may be further increased by changing the via geometry as well as the number of vias per area.

In still another embodiment of the present invention, the present invention is a tabletop setup which is a full $CO_2$ capture and repurpose system. The system is able to use already available resources, such as "ocean" water, to generate renewable fuels. It is also possible that crushed limestone (carbonate) may be added to the solvent carrier to generate CO by-products.

The present invention, in another embodiment is an improved atomizer for spray dryer. Research as shown that the simplest atomizer design has approximately a 4 mil (100 um) to 15 mil (375 um) orifice. The smaller the orifice, the smaller the flow rate, however the great the water is atomized. Fabricated atomizers with various geometrical shapes at the target diameters determine the best spray dryer solution. Vias as small as 5 um to 10 um have been demonstrated. By adding the appropriate materials, a catalytic reaction to begin producing and using by products in the vapor stage is available.

In one embodiment, through vias into a glass wafer may be employed. Using glass makes for a more robust atomizer when the system is an alkaline based hydroxide $CO_2$ dry spray capture. In the typical electrolysis process, the goal is to produce $H_2$ and $O_2$. In the present invention, the goal is form CO as a biogas precursor, as well as other potential fuel gases. Starting with the electrolysis of water, aqueous solution, aerosol or other solvent carrier, a simple well understood process, the present invention is an energy and space effective (smaller footprint) solution to remove and convert $CO_2$ to CO, $H_2$ and $O_2$. Typically, a catalyst such as an acid, base or salt is added to improve the conductivity of water or other solvent carrier, thereby improving the reaction. However, $CO_2$ dissolves in the solvent carrier to form carbonic acid and carbonates, providing the necessary conductivity. Other conductive media may lead to the production of unwanted gases or change the ratio of the desired target output gas, at the electrodes as well as the consumption and destruction of the electrodes. For example, using sodium chloride (NaCl) to improve conductivity results in the production of chlorine and sodium hydroxide ($2NaCl+2H_2O \rightarrow Cl_2+H_2+2NaOH$.) By selecting the correct electrode materials, the dissolved $CO_2$-solvent/electrolyte mix provides the improved conductivity and the reaction media for eventual $CO_2$ reduction.

The present invention utilizes materials, designs and processes to capture carbon while possibly generating feedstocks as a by-product. The electrochemical reduction of carbon dioxide represents a possible means of producing chemicals for fuels and converting $CO_2$ to organic feedstocks such as formic acid (HCOOH), methanol ($CH_3OH$), ethylene ($C_2H_4$), methane ($CH_4$), and carbon monoxide (CO). The syngas reaction products can then readily be turned into other fuels such as diesel. In one embodiment, solutions found in the electronics packaging industry may be employed. One such conceptualization involving an electronics packaging approach is the capability to fabricate micro structures of various metals including copper, tin, aluminum, palladium, gold, nickel and others. Micro structures are inherently more efficient than their macro counterparts (nano materials have proven to be more chemically active than their macro components). As discussed above, using micro structures can improve the efficiency of the simple plate electrode significantly. Separate or combined, micro structure fabrication and vias may be employed to reduce the amount of $CO_2$ in our atmosphere and oceans.

The present invention may provide a $CO_2$ capture and incorporated into liquid, aerosol, vapor, aqueous solution, and other solvent carrier system using a via system. As discussed above, carbonic acid may be formed by bubbling $CO_2$ through a solvent carrier. As $CO_2$ dissolves into the solvent carrier forming carbonic acid, the conductivity increases aiding in the reaction. This process may be accomplished using a renewable energy source, such as solar or wind for electricity.

The present invention may employ similar techniques utilized in the semiconductor packaging industry. Pillar shaped micro metal structures with metal routings may be used to provide electrical bias to those structures. This rerouting process is called redistribution (RDL) and bumping. These metal structures, typically pillars of copper, are a standard flip chip assembly process. This structure may be capped with tin (or a tin alloy) for attachment and assembly during PCB reflow. Copper (oxide) structures may also be used to efficiently generate CO from water, other aqueous solutions, aerosols, or other solvent carriers with dissolved $CO_2$. Tin (II) oxide (SnO) may split the water into almost pure CO. By fabricating copper pillar structures on inert base materials such as glass, silicon and ceramic, such structures are quickly and economically fabricated on these carrier substrates, and when used as the electrodes in an electrolysis system, increase cathode efficiency by over 4,100 percent, saving real estate and system cost. Advancing the semiconductor process a step into the present invention, via technology may be employed.

TGVs, either lined or unlined, may also be used to improve area efficiency over pillars. A setup containing either solution or both (pillars and/or vias), of copper/tin pillar with coated vias as small as 5 um diameter allows for an even higher surface for liquids or vapor interactions. Since these via structures can be metalized with Cu and Sn layers, the complete system may improve the area efficiency by 13,000 percent or more. Furthermore, it is possible to change the geometrical designs and improve the area efficiencies. It is also possible that additional materials, not limited to Cu and Sn, could be used to further optimize the catalytic reactions.

In another embodiment of the present invention, utilizing semiconductor packaging techniques, $H_2$ may be generated or purified from contaminated CO gas. Pd metal is a natural filter for hydrogen. Pd membranes have been used for decades to purify gases such as methane. The efficiency of thin Pd membranes as efficient $H_2$ filters is also know in the industry. In one embodiment, a 4 chambered Hoffman Voltmeter with a source of water/$CO_2$ and three electrode chambers to capture CO, $H_2$ and $O_2$ is utilized. A dual membrane system may be used in the CO chamber to purify the CO biogas. TGV solutions also allow the creation of controlled porosity structures.

Porous ceramics with Pd catalyst may also be used to sequester $H_2$. TGV (and through ceramic vias) as small as 5 um and possibly smaller may be fabricated with higher aspect ratios. These TGV structures with Pd membranes simulate porous ceramics. On these structures, very efficient thin palladium membranes may be attached. While other transition metals work as effective cathodes and may be employed in the present invention, Pd has the distinct functionality as a $H_2$ membrane to capture or purity other gasses that might be generated at the cathode. A heated interposer with 5 um through glass vias may improve cathode efficiency significantly.

There are several ways to capture $CO_2$ gas. Two simple and well understood processes for capturing $CO_2$ gas are available, dry water spray and bubbling. In one embodiment, a spray dryer using Sodium hydroxide (NaOH) or calcium hydroxide (CaOH), hydroxides to form carbonates, may be utilized. Spraying an atomized mist of water or other aqueous solution into a dense, hot gas atmosphere is effective at capturing the components in the heated gas flow. This well understood process is used in various industries for cleaning exhaust gases as well as a targeted fabrication process. As the mist evaporates, the water is very effective at capturing the particulates in the hot air flow. This "dry spray" process also works very well at capturing hot $CO_2$ flue gas. Passing that vaporized gas over an active metal cathode yields target gases. Passing those same gases through high aspect ratio vies yields similar results with much less electrical energy and, in the case of Pd, captures $H_2$. Adding NaOH or CaOH to the water improves the dry spray effectiveness as the $CO_2$ reacts with the basic solution to form carbonates. In another embodiment, a bubbler may be used to capture $CO_2$. At room temperature, water holds 1.5 g of $CO_2$ per kilogram whereas cooler water at 10° C. holds 2.5 grams of $CO_2$ before saturation. A carbonic acid electrolyte is formed during the bubbling $CO_2$ into the water. The carbonic catalyst provides the efficiency for an electrolytic cell and the raw material to generate useable and sustained complexing carbon precursors and simple fuels. Renewable energy, such as wind and solar, may be utilized as it provides more than enough power for this minimal energy requirement process. Bubblers are simple gas feed systems that are the equivalent to an aquarium pump. Thus, in the present invention, bubbling $CO_2$ into CaOH or NaOH likewise forms a carbonate instead of the carbonic acid solution. The rate of $CO_2$ sequestration of the 1.5 g saturation in pure water may be exceeded. In either process, carbonate or carbonic acid, a Cu cathode facilitates the production on CO fuel gas. As noted earlier, electrolysis is carried out by supplying two electrodes with positive and negative potential to reduce and oxide the ions in the water to elemental gases of hydrogen and oxygen. The electrodes are typically inert metal such as platinum or stainless steel with a positive potential (anode) to yield $O_2$ and a negative potential (cathode) to yield hydrogen gas. Hydrogen appears at the cathode, where electrons enter the water (aqueous solution or other solvent carrier), yielding twice as much hydrogen as oxygen. Changing the cathode to Cu yields CO and/or $H_2$ in varying rates. As noted, when bubbled in water, $CO_2$ is captured and forms carbonic acid. The resulting carbonic acid has a twofold purpose, $CO_2$ is captured into the electrolyte and the conductivity of the water is increased. By forming a bicarbonate ion without the sodium that results when using sodium bicarbonate, detrimental and aggressive NaOH solutions are avoided. Hydrogen gas may be produced at the cathode if the correct target metal is selected. However, carbon monoxide may be generated by selecting an alternative metal for the cathode. Various metals (which can also be converted to the oxides of these metals) for the cathode/anode that are typically used in the electronics packaging industry, electrolytic and electroless, may be used to target optimized CO and $H_2$ from $CO_2$. It is also possible to generate alcohols and other useful products in the liquids by selection of the appropriate metal plates.

In the basic electrolysis of water, typically two electrodes are used to separate $H_2O$ into $H_2$ and $O_2$. Hydrogen forms at the positive terminal, cathode and oxygen forms at the negative terminal, anode. With pure water this reaction is very slow as the potential to overcome the attraction of the molecules requires a few electron volts to make the water more electrically conductive. The correct catalysts and electrodes must be utilized to receive the desired reaction. The desired reaction is:

$$CO_2 + 2H+ + 2e- \rightarrow CO + H_2O$$

The redox potential for this reaction is similar to that for hydrogen evolution in aqueous electrolytes. The electrochemical reduction of $CO_2$ is usually competitive with hydrogen evolution reaction in these electrochemical reactions. Typically, stainless steel or platinum electrodes are selected to yield $O_2$ and $H_2$. If a salt, such as sodium chloride were chosen, the chlorine in the NaCl would compete with oxygen yielding a toxic $Cl_2$ molecule with some residual NaOH in the water to attack electrodes. As discussed above, selecting NaOH provides the formation of carbonates making a more effective $CO_2$ capture system. But a copper/copper oxide, tin/tin oxide, and/or palladium/gold/platinum electrode is also acceptable for the $CO_2$ to CO system for the present invention.

Copper, palladium, nickel, tin, gold and platinum are oftentimes typical materials used in the semiconductor packaging industry. Copper is used in routings and pads for assemblies, pillars for attaching die to other die and printed circuit boards as well as fine wire bonding. Palladium is used as an oxide prevention material, similar to gold/platinum/ruthenium, on a number of metals to assure good solder wetting and strong metal-metal bonds. Tin and tin based alloys are used for attaching components. Nickel is used as a barrier layer and support structure to prevent consumption and formation of undesirable alloys. In one embodiment, copper pillars with tin caps as electrodes in an electrolysis like setup as a method to convert $CO_2$ to CO may be employed. In alternate embodiments, $H_2$, $O_2$ and other hydrocarbons may be prepared as well. A second wafer/electrode containing one or more additional materials, such as palladium, which also catalyzes $CO_2$ to CO may be used. The Pd also has a unique feature in that palladium is a natural filter for hydrogen. Thin films of Pd are more efficient than thick such that processes, such as electrolysis, are very cost-effective solutions at producing the membranes. It is also possible that three and more chamber can be created with various iterations to target select by-product production and/or capture. Selecting copper over palladium cathode provides a known electrochemical yield advantage, but Pd provides another opportunity, as a $H_2$ membrane. While copper is up to 20 percent more efficient than palladium in producing CO, palladium provides dual functionality serving both as a cathode material and a thin film membrane that can simultaneously generate and serve as an in-situ $H_2$ filter.

Filters, pillars, membrane or through vias, may be employed to improve the effective area of the electrolytic production process. In addition to increasing effective areas, the materials and techniques used in electronics packaging may further increase, and target, sustainable harvesting of products from $CO_2$. By increasing the effective area of anodes and cathodes, possible multiple chamber systems, the present invention may be used as small, portable, fuel and energy harvesting/generation systems.

Constructs with the addition of material selection/design (pillars (copper capped with tin) and through glass vias (lined with copper and tin) and possibly through vias with Pd membranes may be employed to increase CO/H yield. Wafer bumping is a process that is common in the die assembly world. Typically, a tin based solder is applied to a pad on a die or printed circuit board. This material is heated allowing the formation of a low temperature, but robust and reliable, metal to metal weld joint. In the past, most of these joints were formed with rounded balls of solder on round, square, rectangular or octagonal pads. Because the pads are round, there was a limit on how close the balls could be spaced or else they form electrical shorts. Packaging teams came up with a solution to this limitation by fabricating columns of copper metal called copper pillars. These copper pillars can be fabricated in high aspect ratio features to increase the effective surface area of the structure they are attached. By altering the materials, copper to copper oxide, other metals and hybrids, it is possible to achieve a higher efficient chamber with targeted end product production using lower energy due to the enhanced electro-activity of the smaller structures per surface area. These copper pillars replace the solder balls providing an opportunity for much tighter spacing. In the semiconductor packaging, the copper pillars serve as standoff between adjacent surfaces preventing the two surfaces from collapsing on one another. Tin, discussed later, is used to "weld" these surfaces together. The copper pillar is the backbone of the assembly process but can also be the backbone of a $CO_2$ to CO conversion process. Copper pillars are fabricated by adding seed layers of metal to a wafer. The wafer can be silicon, glass, ceramic or any other material. The next step is to apply and pattern a resist that has the desired feature geometry. By using thicker resist high aspect ratio (taller) features can be made. Ultimately, copper is plated to fill the open holes then the resist removed leaving behind a pillar of copper metal which is a standard process for the semiconductor packaging industry. Adding additional layers, as oxides or pure metals can be accomplished using atomic layer deposition (ALD) and may be incorporated in the present invention. For very high aspect ratio, coating ALD is required whereas CVD, PVD, e-beam and sputtering, etc. are acceptable for moderate aspect ratios, coatings and layering.

TGVs may be fabricated with 20:1 or greater aspect ratios. The challenge has been to coat these vias with robust and hermetic layers. With 20 um diameter, a limit of ~275-300 um is capped. The present invention may utilize ALD as a solution for robust layering for deeper vias. Thin ALD layers also provide unique electrochemical processing that might further improve the catalytic effects. These deep vias are required for supporting strength and handling of the material. An additional benefit is that the smaller diameter vias support capillary effects. Such a system may minimize the need for a pumping system, further reducing the overall system energy input.

A small diameter via has a very strong capillary component. These via have a good ability to draw solution and can also be used as a membrane. By adding the correct metals, bias and via size, it is possible to mitigate migration of solution, maintain correct pH balance in areas of the electrolytic cell and generate targeted materials. Combined with the via geometry and density, it is possible to achieve ultra-high area density in up to and in excess of 15,000 percent.

In one embodiment of the present invention, current is delivered to each pillar by routing traces/wiring. There is also a potential generated between dissimilar metals that can be used to generate power. Pillars may be mounted on a blanket conductive layer or copper traces that may be routed to pillar and connected to a common power node. In the routing mode, targeted pillars or vias can be turned on and off to allow "selectivity" of material production. A simple circuit may also be fabricated to monitor pH, current density in the bath, temperature, etc. for control that current processed do not provide. Antennae and inductors may be added to the system, thereby providing wireless/remote transfer of energy and/or data to and from the system.

In another standard packaging fabrication process, routings are made by adding copper seeds, patterning then growing the traces. The seed layers are etched away leaving the thicker routing. The routing is then covered with polymer followed by using the pillar growing process, which is a well-documented, understood, controlled, economical and reliable process. Other routing techniques are available as well, but this copper routing is described as one of many techniques which may be utilized in the present invention. The metal may be evaporated in a liftoff like process as one other example. Hybrid designs may be developed to optimize to support best design, optimum cost and fit for multiple solutions. But one other item to make the process more efficient is the usage of tin. Tin or tin alloys are typically used to provide the metallurgical joining between components in semiconductor packaging. Other metals, oxides and materials may be applied to the pillar/via application, such as Sn, SnO and Sn alloys to optimize efficiency. It should be understood, the materials listed above is not a limiting list and other materials (such as In, Bi, Pb, Sn, Au, Pd, Cu, Ag, etc. are but a few, including their oxides and alloys) may be used. Adding tin is accomplished by continuing the pillar building process. Instead of terminating the process after copper plating, the sample may be immersed in a tin plating bath (electroless or electrolytic) or placed in a metal deposition chamber (such as ALD, ebeam, sputter, etc.) to add the tin cap surface layer. It has been demonstrated that adding tin improves the conversion of carbonate to CO efficiency to over 90%. Adding that inexpensive cap of tin (or tin based materials) demonstrates a $CO_2$ sequestration system that is almost directly in-line and equivalent with the processes and fabrication solutions used by in the semiconductor packaging industry and might be instrumental in helping reduce the $CO_2$ greenhouse gas level in the environment. It is also possible to completely immerse the Cu-based layer with Sn based materials. Analyzing the products will help determine material and selectivity, including but not limited to, oxides, other metals and/or their oxides, and plated through via solutions. As discussed above, inductors and/or antenna may be added to provide energy harvesting/transfer. It is also possible the correct tuning of an antenna-like or inductor-like device may yield splitting of the electrolyte for production of targeted products. The correct design may generate a frequency, similar to microwave, that optimizes the splitting of water, energizing water, or even target the splitting of the materials in the system, such as carbonates, or $CO_2$ itself, to split, energize, catalyze, etc. the solution wirelessly.

Although descriptions discussed above and described in the figures below may discuss aqueous solutions, the present invention may be utilized with any solvent carrier (e.g., aqueous solution, aerosol, other hydrocarbons or other types of solvent carriers) and still remain in the scope of the present invention. FIG. 1 illustrates a standard aqueous solution reduction cell 10 in one embodiment of the present invention 10. In this embodiment of the present invention, electrodes are powered with a DC current 12 is supplied through the circuit to generate oxygen ($O_2$) at an anode 20 and hydrogen ($H_2$) at a cathode 22. These electrodes are typically stainless steel in the aqueous solution (solvent carrier) reduction process, but the electrodes may be constructed of any metal or materials capable of transferring electrical current such as mesh, conductive metal oxides, etc. The electrodes may take any shape, the electrodes may be round, rectangular, square, or any geometrical shape to fit the cell. For illustrative purposes only, the plates are rectangular and constructed of stainless steel. For an efficient process, an electrolyte is added to make the water, other aqueous solution or solvent carrier more electrically conductive. The present invention shows an increased efficiency at converting $CO_2$ to useful products, such as CO, and how a plate with palladium metal can be used to both improve purity, process efficiency and possibly support development of a small engine/power source possibly serving as a battery source.

Figure 2:
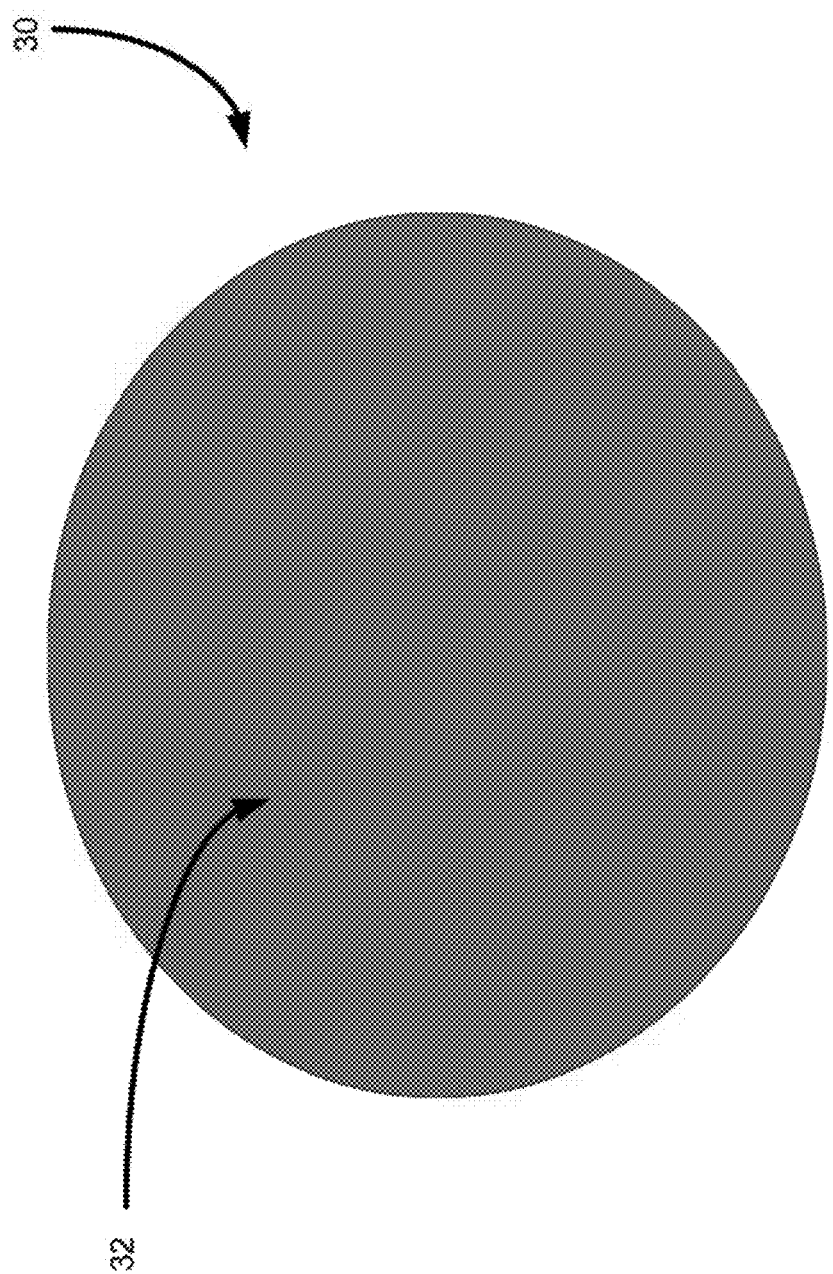
FIG. 2 illustrates a top view of a round electrode in one embodiment of the present invention.

FIG. 2 illustrates a top view of a round electrode 30 in one embodiment of the present invention. The round electrode 30 includes an active surface 32, which is the surface of the wafer (electrode). The surface area on each side is defined as $SA=\pi r^2$. Thus, the active surface area includes the top and bottom of the plate or electrode 30, with negligible effects from the side for a thin plate. As depicted, the electrode 30 is a wafer.

Figure 3:
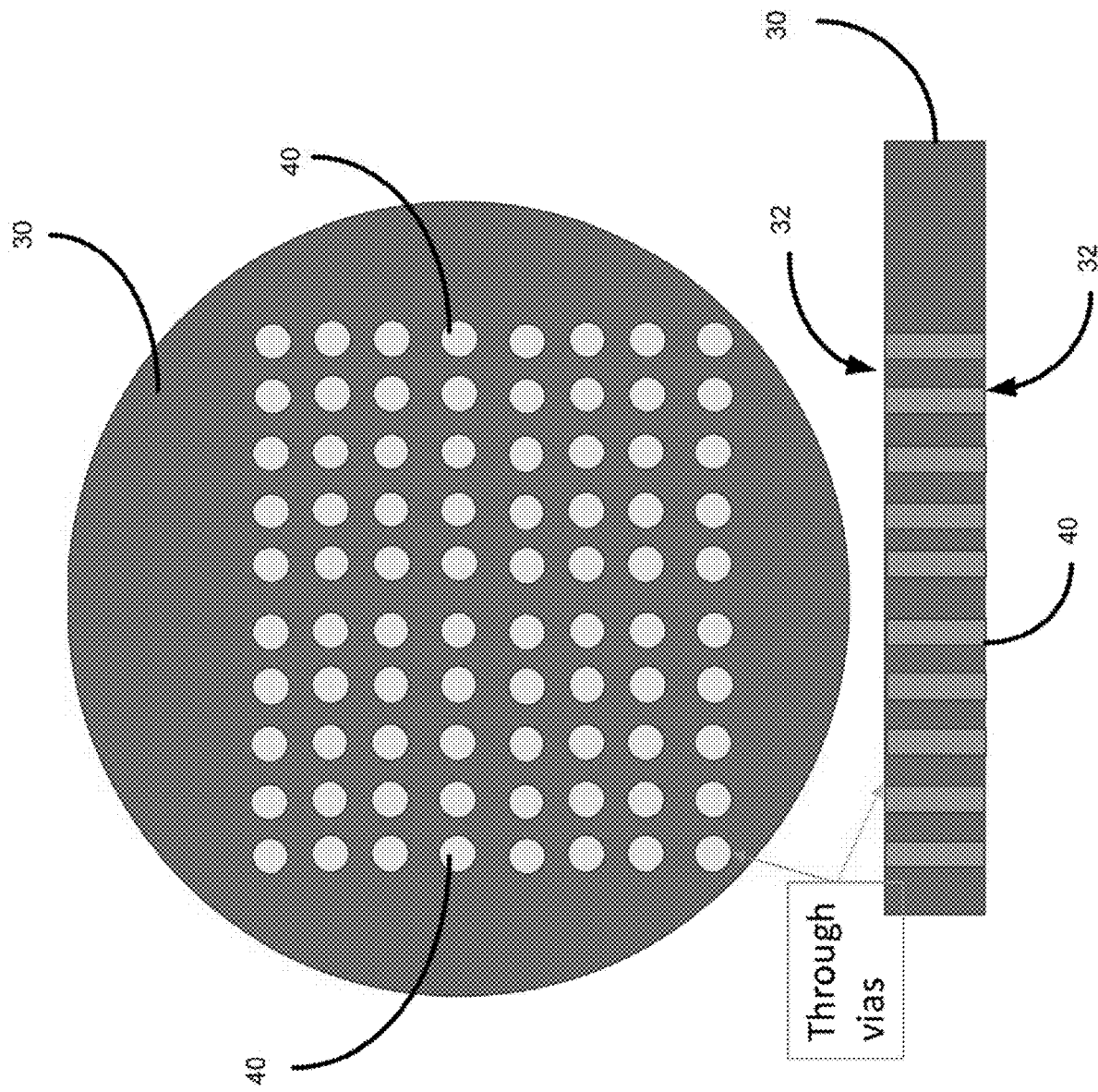
FIG. 3 are top and side views of the round electrode having a plurality of vias.
Figure 4:
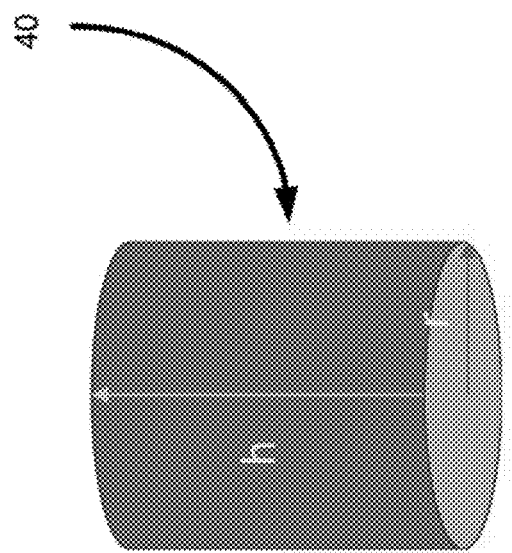
FIG. 4 is a side view of a view showing dimensions for a single via.

As discussed above, an increased surface results from the addition of vias. FIG. 3 are top and side views of the round electrode 30 having a plurality of vias 40. In the case of a circular via 40, the area of each via 40 is defined by the area of a "internal" cylinder, $SA=2\pi rh+2\pi r^2$. FIG. 4 is a side view of a view showing dimensions height h and radius r for a single via 40. The dimensions illustrated in FIG. 4 are used for calculating the additional surface area of the via 40. Each via 40 provides an additional surface area such that one million vias would increase the active surface area by $10^6 \times SA$. A 4-inch wafer could have an increased surface area by over 130 times depending on the via geometry and quantity. Additionally, capillary effects of the lined via eliminates/reduces the need for a pumping system and smaller size (simulating nanoparticles) makes for a more chemically/catalytically active structure.

Figure 5:
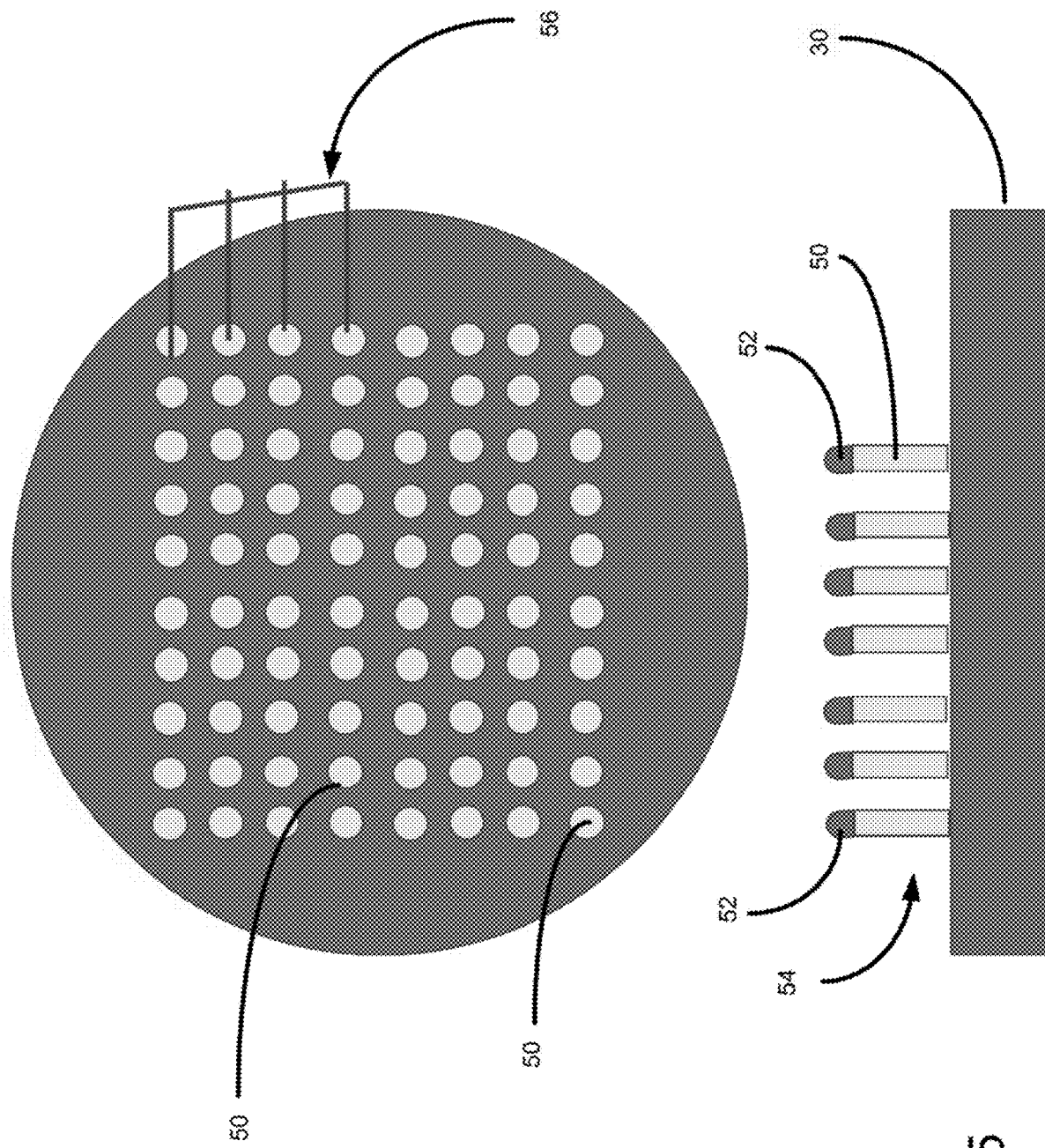
FIG. 5 is a top and side view of the electrode having a plurality of pillars.

To increase the active area even more, a cap structure (bumped pillar) may be utilized. FIG. 5 is a top and side view of the electrode 30 having a plurality of pillars 50. The pillars 50 (e.g., constructed of copper) may include a cap 52 (constructed of tin or tin alloy in one example) forming a bumped pillar 54 embodiment, further increasing the active area. The total surface area is defined as the surface area of the cylinder plus the surface area of the cap, where the cap is represented as an ½ sphere (sphere has $SA=4\pi r^2$). Total area of each bumped pillar 54 is equivalent to $SA_t=2\pi rh+2\pi r^2+2\pi r^2$ multiplied by the total number of structures. Each via adds its surface area to the total by a multiplicity. One million pillars (or pillars+caps) add an area of $10^6 \times SA_t$ in addition to the surface area of the wafer. Such an increase in surface area is typical in a wafer bumping with up to a few hundred million or more vias being added to even a small wafer. Pillars can increase the overall surface area by up to and over 80 times depending on the wafer size. Pillars may also increase the chemical activity of the layer as the smaller geometry providing nano-like chemical effects. Electrical traces/routing 56 may be added to selectively turn on and off specific pillars to target specific results, such as gas selectivity, electrolyte generation, bio materials, hydrogen filtration/recovery, etc. Metal routings to a pad may be utilized. Those pads may also work as antennae. The body of the metal routing forms an optional coil which may be wireless while also serving as a catalytic layer copper layer that may be coated completely or partially with a tin based alloy. Pillars may also be fabricated directly on the winding or pads.

Figure 6:
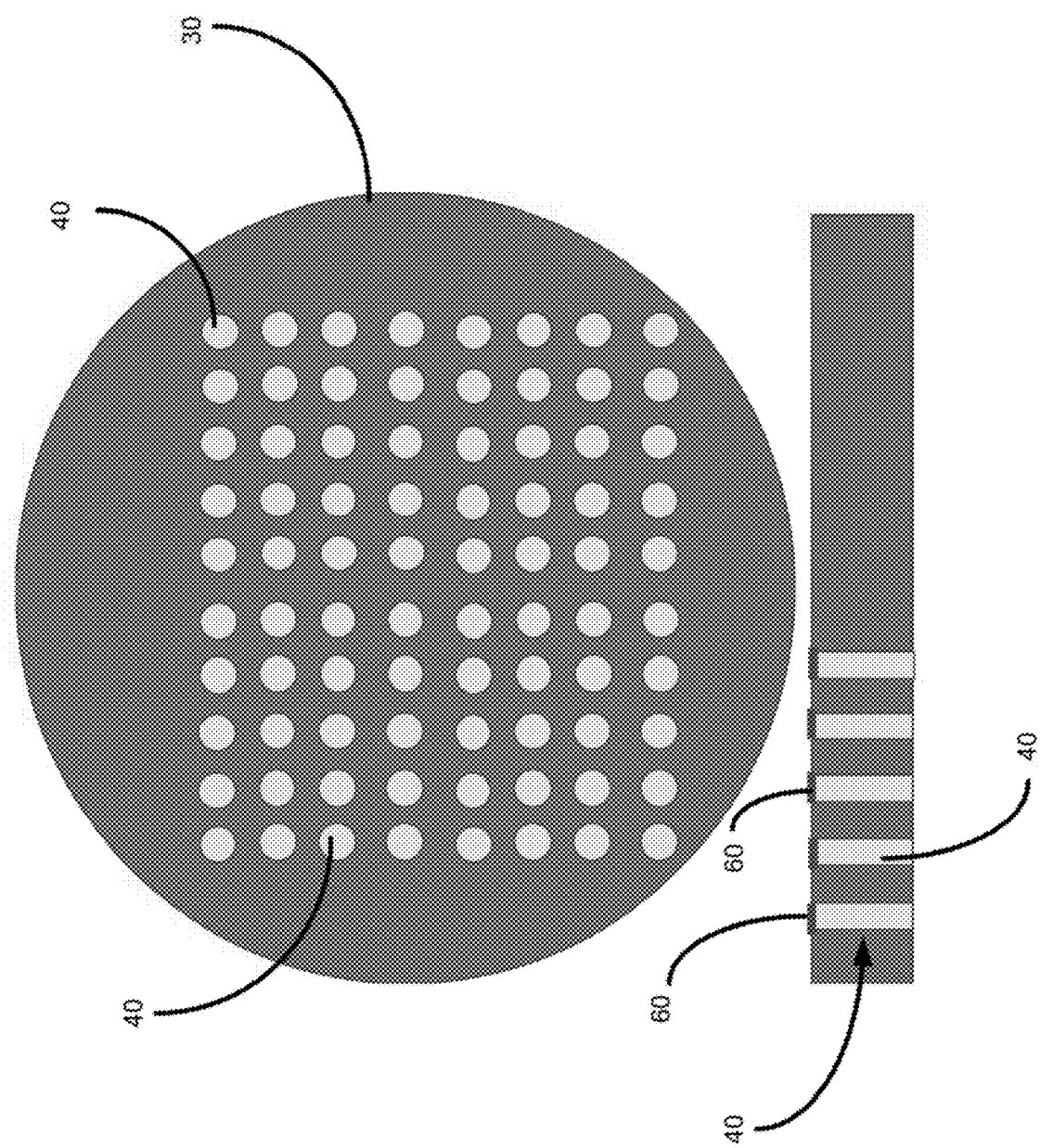
FIG. 6 is a top and side view of the electrode having a plurality of vias having palladium metal caps.

FIG. 6 is a top and side view of the electrode 30 having vias 40, each having a palladium metal cap 60. Palladium is a natural filter for hydrogen. In one embodiment, the vias 40 are capped with palladium metal to allow $H_2$ gas to pass, while entrapping other materials. A thin film membrane of Pd serves as an excellent, and strongly active $H_2$ filter allowing for purification of other gases in the electrolysis or pure $H_2$ capture. For example, in a carbonate capture system, CO and $H_2$ are two of the gases generated at the cathode when a catalytic metal is used, such as copper and tin, in a $CO_2$ sequestration system. The Pd filter may be used to block CO yet passes $H_2$ for pure $H_2$ gas at one collection point and CO at the other. In other embodiments, other metals, materials, or membranes may be used in place of Pd. In another embodiment, Pd may be used to line the via, thereby providing an active layer for $H_2$ generation or filtration. In addition, electrical routing 56 (shown in FIG. 5) may be used to add selectivity and current to and/or from a target layer, structure or surface.

Figure 7:
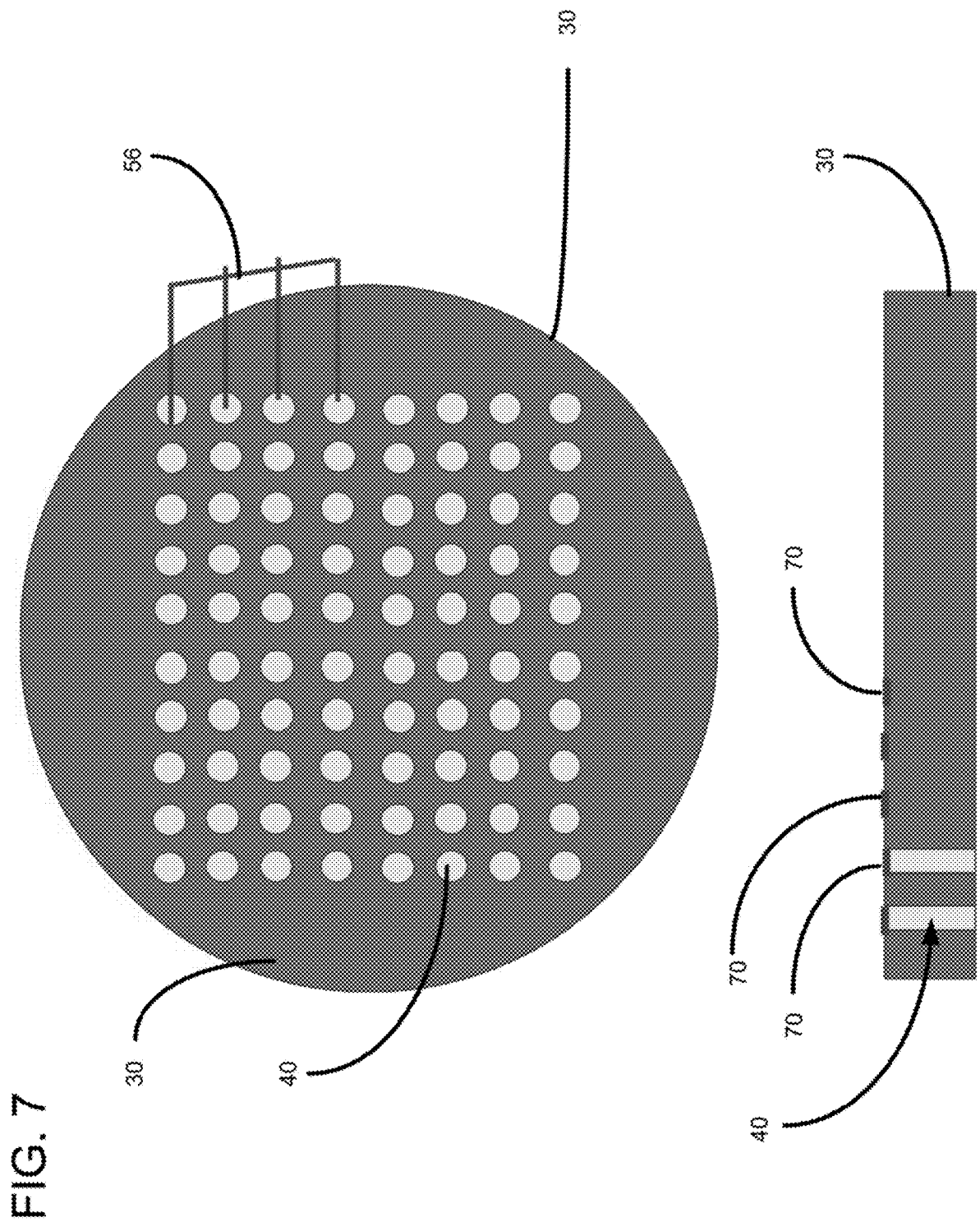
FIG. 7 illustrates an electrode having a plurality of vias and structures in another embodiment of the present invention.

In another embodiment of the present invention, the electrodes may include structures 70 having the functionality of windings or pads that support wireless power generation. FIG. 7 illustrates an electrode 30 having a plurality of vias 40 and structures 70 in another embodiment of the present invention. These structures 70 may be fabricated that function or operate like coils, pads, patch, etc. or other geometrical structures to support fabrication of inductors or antennae or energy harvesting. With such structures 70, not only can the pads serve as electrodes in the typical circuit where current is supplied via "wired" interface, these structures support using wireless features that can be powered up to serve as electrodes or even in the microwave range and any other frequency to manipulate the electrolyte, by-products, or energy potential. With small size, higher frequencies can be obtained and once again, the structures add the benefit of behaving similar to enhanced chemically active nano-like particles. It is possible to add combinations of pillars, wireless, routing, vias, etc. for the most useful and efficient end system.

The present invention provides a system where $CO_2$ incorporated into an solvent-based media is "repurposed" to usable materials rather than recycled back into the environment using solutions familiar to semiconductor packaging techniques. Additionally, the present invention provides a system for mitigating and reducing the amount of $CO_2$ while simultaneously creating a useful by-product, such as formic acid (HCOOH), methanol ($CH_3OH$), ethylene ($C_2H_4$), methane ($CH_4$), carbon monoxide (CO), hydrogen and oxygen. Reducing $CO_2$ emissions helps in mitigating problems that can lead to climatic issues as well as ecological concerns.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A CO2 capture and sequestration system, the system comprising:
   a reduction cell for separating a solvent-based carrier, the reduction cell having an anode generating oxygen and a cathode generating hydrogen from solvent-based carrier;
   a power supply for providing electrical power to the anode and the cathode, wherein an electrolysis process occurs whereby oxygen and hydrogen are produced;
   wherein the cathode includes a plurality of geometrical constructs to increase an active surface area of the cathode for increasing an efficiency of the electrolysis process;
   wherein the cathode is a Through Glass Via (TGV) wafer;
   wherein each geometrical construct of the plurality of geometrical constructs are separate, controlled constructs providing controlled capillary.

2. The CO2 capture and sequestration system according to claim 1 wherein the plurality of geometrical constructs are constructed of a metallic substance.

3. The CO2 capture and sequestration system according to claim 2 wherein the system converts CO2 into a second material.

4. The CO2 capture and sequestration system according to claim 2 wherein the system captures CO2 into a liquid-based media.

5. The CO2 capture and sequestration system according to claim 1 further comprising a spray nozzle for capturing CO2 from air.

6. The CO2 capture and sequestration system according to claim 1 wherein the captured CO2 is repurposed for other uses.

7. The CO2 capture and sequestration system according to claim 1 wherein a metallic alloy is applied to the surface of the cathode.

8. The CO2 capture and sequestration system according to claim 1 wherein the plurality of geometrical constructs includes a plurality of pillars.

9. The CO2 capture and sequestration system according to claim 8 wherein the plurality of pillars is constructed of a metallic substance.

10. The CO2 capture and sequestration system according to claim 8 wherein the plurality of pillars is constructed of a metal oxide.

11. The CO2 capture and sequestration system according to claim 1 wherein the plurality of geometrical constructs includes a plurality of vias.

12. The CO2 capture and sequestration system according to claim 11 wherein the plurality of vias are coated with a metal.

13. The CO2 capture and sequestration system according to claim 11 wherein the plurality of vias are coated with a metal oxide.

14. The CO2 capture and sequestration system according to claim 11 wherein the plurality of vias are electrically conductive.

15. The CO2 capture and sequestration system according to claim 11 wherein the plurality of vias are wirelessly receptive.

16. The CO2 capture and sequestration system according to claim 11 wherein the anode and cathode include a film membrane covering the plurality of vias.

17. The CO2 capture and sequestration system according to claim 16 wherein the film membrane is constructed of palladium to filter H2 from the solvent-based carrier.

18. The CO2 capture and sequestration system according to claim 11 wherein the plurality of vias simulate a controlled porous structure.

19. The CO2 capture and sequestration system according to claim 18 wherein the plurality of vias are coated with a metal substance.

20. The CO2 capture and sequestration system according to claim 19 wherein the metal substance of the vias creates a potential to provide an electromotive force.

21. The CO2 capture and sequestration system according to claim 19 wherein the metallic coated vias serve as a membrane.

22. The CO2 capture and sequestration system according to claim 19 wherein the metallic coated vias serve as an extra active catalyst.

23. The CO2 capture and sequestration system according to claim 11 wherein the plurality of vias are high aspect ratio vias for activating materials in a vapor phase fluidic flow.

24. The CO2 capture and sequestration system according to claim 11 wherein the plurality of vias creates the capillary effect.

25. The CO2 capture and sequestration system according to claim 11 wherein a solar cell is added to the cathode to supply power to the cathode.

26. The CO2 capture and sequestration system according to claim 11 wherein the plurality of vias support separation of a vapor in the electrolysis process.

27. The CO2 capture and sequestration system according to claim 1 wherein the plurality of geometrical constructs includes a plurality of vias and a plurality of pillars.

28. The CO2 capture and sequestration system according to claim 1 wherein the geometrical constructs include an antenna to transmit or receive data or energy.

29. The CO2 capture and sequestration system according to claim 1 wherein the geometrical constructs include a coil to transmit or receive data or energy.

30. The CO2 capture and sequestration system according to claim 1 wherein the solvent-based carrier is an aqueous solution.

31. The CO2 capture and sequestration system according to claim 1 wherein the solvent-based carrier is an aerosol.

32. The CO2 capture and sequestration system according to claim 1 wherein the solvent-based carrier is a hydrocarbon carrier.

33. The CO2 capture and sequestration system according to claim 1 wherein the system is configured to utilize a natural water source to obtain CO2 into a liquid-based media.

34. The CO2 capture and sequestration system according to claim 1 wherein each geometrical construct of the plurality of geometrical constructs includes a separate electrical routing to the cathode.

35. The CO2 capture and sequestration system according to claim 11 wherein a metallic alloy is applied to a surface of each of the vias of the plurality of vias.

36. The CO2 capture and sequestration system according to claim 1 wherein the anode is located with the cathode on the TGV wafer.

\* \* \* \* \*